(12) United States Patent
Aoki

(10) Patent No.: US 10,507,821 B2
(45) Date of Patent: Dec. 17, 2019

(54) HYBRID VEHICLE AND METHOD OF CONTROLLING THE SAME

(71) Applicant: TOYOTA JIDOSHA KABUSHIKI KAISHA, Toyota-shi, Aichi-ken (JP)

(72) Inventor: Kazuma Aoki, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 53 days.

(21) Appl. No.: 15/834,801

(22) Filed: Dec. 7, 2017

(65) Prior Publication Data
US 2018/0170351 A1    Jun. 21, 2018

(30) Foreign Application Priority Data
Dec. 21, 2016    (JP) .................................. 2016-248153

(51) Int. Cl.
*B60W 20/13*    (2016.01)
*B60W 50/08*    (2012.01)
(Continued)

(52) U.S. Cl.
CPC .............. *B60W 20/13* (2016.01); *B60K 6/445* (2013.01); *B60W 10/06* (2013.01); *B60W 10/08* (2013.01); *B60W 20/20* (2013.01); *B60W 30/192* (2013.01); *B60W 50/082* (2013.01); *B60W 50/087* (2013.01); *B60W 50/12* (2013.01); *B60W 2050/0002* (2013.01); *B60W 2510/242* (2013.01); *Y02T 10/6239* (2013.01); *Y02T 10/6286* (2013.01)

(58) Field of Classification Search
CPC ...................................................... B60W 20/13
See application file for complete search history.

(56) References Cited

U.S. PATENT DOCUMENTS 8,269,641 B2 * 9/2012 Bauman .................... H02J 7/14
                                                  180/65.29
8,682,546 B2 * 3/2014 Otsuka .................. F02D 11/105
                                                  123/192.1
(Continued)

FOREIGN PATENT DOCUMENTS

JP    2011-084137 A    4/2011
JP    2013-154715      8/2013
(Continued)

*Primary Examiner* — Alex C Dunn
(74) *Attorney, Agent, or Firm* — Finnegan, Henderson, Farabow, Garrett & Dunner, LLP

(57) ABSTRACT

A hybrid vehicle includes a power generation apparatus including an engine and an electric motor, an electricity storage device configured to supply electricity to the electric motor or to be supplied with electricity from the electric motor, a mode switch configured to permit a driver to perform switching between a CD mode and a CS mode, and an electronic control unit. The electronic control unit is configured to control the power generation apparatus such that the engine is started up with a higher frequency when the driver switches the traveling mode from the CD mode to the CS mode while the state-of-charge is higher than the upper limit of the control center value, than when the driver switches the traveling mode from the CD mode to the CS while the state-of-charge is equal to or lower than the upper limit of the control center value.

11 Claims, 10 Drawing Sheets

(51) Int. Cl.
*B60W 50/12* (2012.01)
*B60W 30/192* (2012.01)
*B60K 6/445* (2007.10)
*B60W 10/06* (2006.01)
*B60W 10/08* (2006.01)
*B60W 20/20* (2016.01)
*B60W 50/00* (2006.01)

(56) References Cited

U.S. PATENT DOCUMENTS

| | | | | |
|---|---|---|---|---|
| 9,260,107 | B2* | 2/2016 | Doering | B60K 6/48 |
| 9,862,397 | B2* | 1/2018 | Meyer | B61L 27/0016 |
| 10,137,880 | B2* | 11/2018 | Ogawa | B60K 6/445 |
| 2007/0275819 | A1* | 11/2007 | Hirata | B60K 6/365 |
| | | | | 477/5 |
| 2009/0322503 | A1* | 12/2009 | Suzuki | B60L 50/16 |
| | | | | 340/438 |
| 2012/0203414 | A1* | 8/2012 | Akutsu | B60K 6/26 |
| | | | | 701/22 |
| 2013/0073136 | A1* | 3/2013 | Yamamoto | B60K 6/445 |
| | | | | 701/22 |
| 2013/0211641 | A1* | 8/2013 | Fujii | B60W 10/06 |
| | | | | 701/22 |
| 2013/0231815 | A1* | 9/2013 | Tanishima | B60K 6/48 |
| | | | | 701/22 |
| 2013/0296136 | A1* | 11/2013 | Doering | B60K 6/48 |
| | | | | 477/167 |
| 2014/0156132 | A1* | 6/2014 | Ichimoto | B60W 10/06 |
| | | | | 701/22 |
| 2016/0185340 | A1* | 6/2016 | Yoshida | B60W 20/13 |
| | | | | 701/22 |
| 2016/0368483 | A1* | 12/2016 | Nawata | B60W 10/06 |
| 2017/0009667 | A1* | 1/2017 | Asami | B60W 20/16 |

FOREIGN PATENT DOCUMENTS

| | | |
|---|---|---|
| JP | 2013-154720 A | 8/2013 |
| JP | 2013-252853 | 12/2013 |
| JP | 2016-88128 | 5/2016 |

* cited by examiner

HYBRID VEHICLE AND METHOD OF CONTROLLING THE SAME

INCORPORATION BY REFERENCE

The disclosure of Japanese Patent Application No. 2016-248153 filed on Dec. 21, 2016 including the specification, drawings and abstract is incorporated herein by reference in its entirety.

BACKGROUND

1. Technical Field

The disclosure relates to a hybrid vehicle, and relates also to a method of controlling the hybrid vehicle.

2. Description of Related Art

Japanese Unexamined Patent Application Publication No. 2013-252853 (JP 2013-252853 A) describes a hybrid vehicle including a power generation apparatus that includes an electric motor and an engine provided with an exhaust gas catalyst, and an electricity storage device configured to supply electricity to the electric motor or to be supplied with electricity from the electric motor. In the hybrid vehicle described in JP 2013-252853 A, either a charge-depleting (CD) mode or a charge-sustaining (CS) mode can be set as a traveling mode of the hybrid vehicle. In the hybrid vehicle described in JP 2013-252853 A, while the traveling mode is the CD mode, a higher priority is given to electric traveling (EV traveling) in which only the electric motor is used as a power source to promote consumption of electricity stored in the electricity storage device, while hybrid traveling (HV traveling) accompanied by an operation of the engine is also permitted. On the other hand, while the traveling mode of the hybrid vehicle is the CS mode, switching between HV traveling and EV traveling is performed as needed, to maintain the state-of-charge (SOC) of the electricity storage device within a prescribed range.

As this kind of hybrid vehicle, Japanese Unexamined Patent Application Publication 2013-154715 (JP 2013-154715 A) describes a hybrid vehicle provided with a switch for performing switching from an EV (CD) mode where the hybrid vehicle travels using only an electric motor as a power source without using an engine as a power source, to an HV (CS) mode where the hybrid vehicle travels using both the engine and the electric motor as power sources. While the hybrid vehicle according to JP 2013-154715 A is traveling in the HV mode after a driver manually switches the traveling mode from the EV mode to the HV mode, an SOC control center value, which is a control target value of the state-of-charge (SOC) of an electricity storage device, is set to a value higher than the SOC of the electricity storage device at the time when the hybrid vehicle is traveling in the EV mode immediately before the traveling mode is switched to the HV mode. Thus, the SOC of the electricity storage device at the time when the driver manually switches the traveling mode from the EV mode to the HV mode can be maintained while the hybrid vehicle is traveling in the HV mode after the traveling mode is switched to the HV mode. JP 2013-154715 A further describes that, while the hybrid vehicle is traveling in the HV mode after the driver manually switches the traveling mode from the EV mode to the HV mode, the SOC of the electricity storage device at the time when the traveling mode is switched from the EV mode to the HV mode, is set as the SOC control center value.

SUMMARY

It is desirable to set, in advance, an upper limit (and a lower limit) of the SOC control center value, which is a control target value of the SOC, from the viewpoint of protection of the electricity storage device and relaxation of the prohibition of regenerative braking. However, in a hybrid vehicle configured to permit a driver to switch the traveling mode from the CD mode to the CS mode, when the SOC is higher than the upper limit of the SOC control center value, the traveling mode may be switched from the CD mode to the CS mode by a driver who attempts to maintain the SOC at a high level. In such a case, the SOC of the electricity storage device is sufficiently high. Therefore, although the traveling mode is the CS mode, the engine starting-up frequency corresponding to a request (the magnitude of power required for traveling) from the driver decreases, and a load (work) of the engine that has been started up also decreases. For this reason, in the hybrid vehicle described in JP 2013-154715 A, when the traveling mode is switched from the CD mode to the CS mode while the SOC is higher than the upper limit of the SOC control center value, the engine is started up in a state where the temperature of an exhaust gas catalyst has been decreased. This may reduce the exhaust gas control performance.

The disclosure suppresses, in a hybrid vehicle in which one of a CD mode and a CS mode is selectively set as a traveling mode, reduction in the exhaust gas control performance when a driver switches the traveling mode from the CD mode to the CS mode.

A first aspect of the disclosure relates to a hybrid vehicle configured such that one of a charge-depleting mode and a charge-sustaining mode is selectively set as a traveling mode. The hybrid vehicle includes a power generation apparatus including an engine and an electric motor, an electricity storage device, a mode switch, and an electronic control unit. The engine is provided with an exhaust gas catalyst. The electric motor is configured to generate electricity with use of at least part of power from the engine. The electricity storage device is configured to supply electricity to the electric motor or to be supplied with electricity from the electric motor. The mode switch is configured to permit a driver to perform switching between the charge-depleting mode and the charge-sustaining mode. The electronic control unit is configured to control the power generation apparatus such that a state-of-charge of the electricity storage device approaches a control center value that is equal to or lower than an upper limit set in advance, while the traveling mode is the charge-sustaining mode. The electronic control unit is configured to control the power generation apparatus such that the engine is started up with a higher frequency when the driver switches the traveling mode from the charge-depleting mode to the charge-sustaining mode while the state-of-charge is higher than the upper limit of the control center value, than when the driver switches the traveling mode from the charge-depleting mode to the charge-sustaining mode while the state-of-charge is equal to or lower than the upper limit of the control center value.

With this configuration, the power generation apparatus is controlled such that the engine is started up with a higher frequency when the driver switches the traveling mode from the charge-depleting (CD) mode to the charge-sustaining (CS) mode while the state-of-charge (SOC) is higher than the upper limit of the control center value, than when the driver switches the traveling mode from the CD mode to the CS mode while the SOC is equal to or lower than the upper limit of the control center value. Thus, a time interval at which the engine is started up becomes shorter. Thus, when the engine is once started up after the driver switches the traveling mode from the CD mode to the CS mode, the temperature of the exhaust gas catalyst can be kept high. As a result, it is possible to suppress reduction in the exhaust gas control performance when the driver switches the traveling mode from the CD mode to the CS mode.

In the hybrid vehicle, the electronic control unit may be configured to set the control center value to a value equal to or higher than the upper limit, based on the SOC at a time of switching of the traveling mode to the CS mode, when the driver switches the traveling mode to the CS mode while the SOC is higher than the upper limit of the control center value, and configured to decrease the control center value over time. Thus, the SOC of the electricity storage device is gradually decreased, whereby the engine is more likely to be started up. Further, it is possible to respond to the driver's needs to maintain the SOC of the electricity storage device at a high level by switching the traveling mode from the CD mode to the CS mode.

In the hybrid vehicle, the electronic control unit may be configured to decrease the control center value over time by setting, as the control center value, a smaller one of an immediately preceding value of the control center value and a present value of the SOC at prescribed time intervals after the driver switches the traveling mode to the CS mode.

In the hybrid vehicle, the electronic control unit may be configured to decrease the control center value over time by setting, as the control center value, a smaller one of an immediately preceding value of the control center value and a value obtained by subtracting a prescribed value from a present value of the SOC at prescribed time intervals after the driver switches the traveling mode to the CS mode.

In the hybrid vehicle, the electronic control unit may be configured to decrease the upper limit of the control center value over time and to set the control center value such that the control center value does not exceed the upper limit, after the driver switches the traveling mode to the CS mode.

In the hybrid vehicle, the electronic control unit may be configured to set the control center value such that the control center value is decreased at a prescribed rate of change after the driver switches the traveling mode to the CS mode.

In the hybrid vehicle, the electronic control unit may be configured to decrease the control center value over time until the control center value becomes equal to or lower than the upper limit after the driver switches the traveling mode to the CS mode, and to set the upper limit as the control center value when the control center value becomes equal to or lower than the upper limit. Thus, even after the SOC becomes equal to or lower than the upper limit of the control center value, it is possible to respond to the driver's needs to maintain the SOC of the electricity storage device at a high level by switching the traveling mode from the CD mode to the CS mode.

In the hybrid vehicle, the electronic control unit may be configured to start up the engine when a required traveling power required of the power generation apparatus is equal to or larger than a start determination power while the traveling mode is the CS mode, and the electronic control unit may be configured to increase the start determination power as the SOC is higher than the control center value and to decrease the start determination power as the SOC is lower than the control center value. With this configuration, the control center value is set to a value equal to or higher than the upper limit in response to switching of the traveling mode to the CS mode performed by the driver and based on the SOC at the time when the traveling mode is switched to the CS mode, and the control center value is decreased over time, whereby an increase in the difference between the SOC and the control center value can be suppressed. Thus, an increase in the engine-start determination power based on the difference can be suppressed, and thus, the engine can be started up with a higher frequency.

In the hybrid vehicle, the electronic control unit may be configured to start up the engine when the required traveling power required of the power generation apparatus is equal to or larger than a start determination power corresponding to a vehicle speed while the traveling mode is the CS mode, and the electronic control unit may be configured to increase a frequency with which the engine is started up, by setting the start determination power such that the start determination power when the driver switches the traveling mode to the CS mode while the SOC is higher than the upper limit of the control center value, is smaller, at the same vehicle speed, than the start determination power when the driver switches the traveling mode to the CS mode while the SOC is equal to or lower than the upper limit. With this configuration, it is possible to suppress reduction in the exhaust gas control performance when the driver switches the traveling mode from the CD mode to the CS mode.

In the hybrid vehicle, the electronic control unit may be configured to decrease the start determination power until the control center value becomes equal to or lower than the upper limit after the driver switches the traveling mode to the CS mode.

In the hybrid vehicle, the electricity storage device may be configured to be charged with electricity from an external power source. Needless to say, the electricity storage device may be an electricity storage device that cannot be charged with electricity from an external power source.

A second aspect of the disclosure relates to a method of controlling a hybrid vehicle including a power generation apparatus that includes an engine and an electric motor, an electricity storage device, and an electronic control unit. The engine is provided with an exhaust gas catalyst. The electric motor is configured to generate electricity with use of at least part of power from the engine. The electricity storage device is configured to supply electricity to the electric motor or to be supplied with electricity from the electric motor. The hybrid vehicle is configured such that one of a CD mode and a CS mode is selectively set as a traveling mode. The hybrid vehicle is configured to permit a driver to perform switching between the CD mode and the CS mode. The method includes starting up, by an electronic control unit, the engine with a higher frequency when the driver switches the traveling mode from the CD mode to the CS mode while a SOC of the electricity storage device is higher than an upper limit of a control center value of the SOC in the CS mode, than when the driver switches the traveling mode from the CD mode to the CS mode while the SOC is equal to or lower than the upper limit of the control center value.

According to this method, it is possible to suppress reduction in the exhaust gas control performance when the driver switches the traveling mode from the CD mode to the CS mode.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments of the disclosure will be described with reference to the accompanying drawings.

Figure 1:
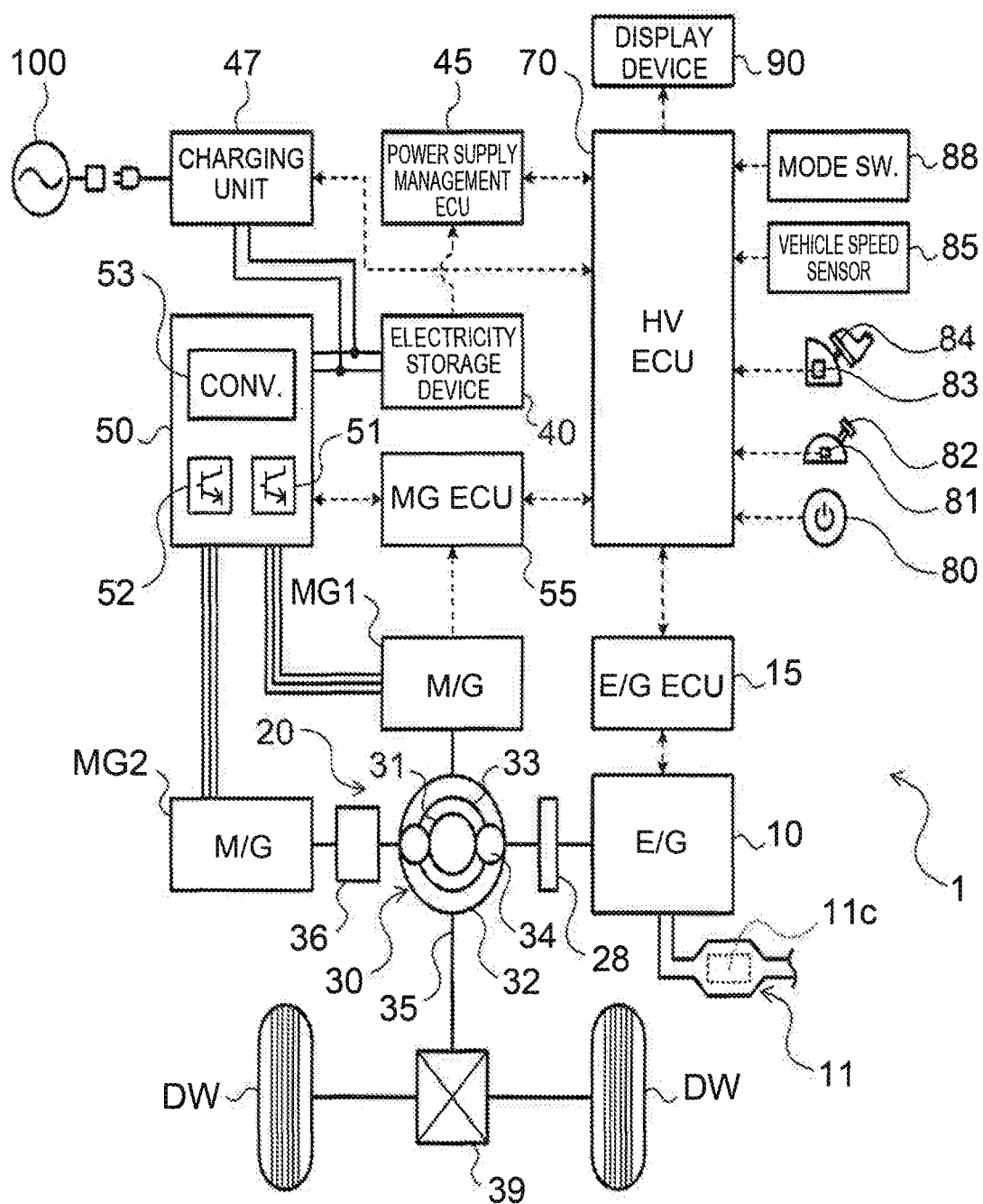
FIG. 1 is a diagram schematically illustrating the configuration of a hybrid vehicle according to the disclosure.

FIG. 1 is a diagram schematically illustrating the configuration of a hybrid vehicle 1 according to the disclosure. The hybrid vehicle 1 illustrated in FIG. 1 includes an engine 10, a planetary gear mechanism 30 of a single pinion type, motor generators MG1, MG2 each of which is a synchronous generator-motor, an electricity storage device 40, an electricity controller (hereinafter, referred to as "PCU") 50 connected to the electricity storage device 40 and configured to drive the motor generators MG1, MG2, and a hybrid electronic control unit (hereinafter, referred to as "HVECU") 70 configured to control the entirety of the hybrid vehicle 1. In the hybrid vehicle 1, the engine 10, the planetary gear mechanism 30, and the motor generators MG1, MG2 constitute a power generation apparatus 20 of a hybrid type.

The engine 10 is an internal combustion engine in which an air-fuel mixture of air and hydrocarbon fuel, such as gasoline, diesel oil, or liquefied petroleum gas (LPG), is burned, whereby power is generated. The engine 10 is controlled by an engine electronic control unit (hereinafter, referred to as "engine ECU") 15 including a microcomputer that includes a central processing unit (CPU) and so forth (not illustrated). As illustrated in FIG. 1, the engine 10 is provided with an exhaust gas control apparatus 11 connected to an exhaust pipe. The exhaust gas control apparatus 11 includes an exhaust gas catalyst (three-way catalyst) 11c of a NOx storage-type, which is configured to remove pollutants, such as carbon monoxide (CO), HC, and NOx, contained in the exhaust gas flowing from a combustion chamber of the engine 10 into the exhaust gas control apparatus 11 via the exhaust pipe.

The planetary gear mechanism 30 includes a sun gear 31 connected to a rotor of the motor generator MG1, a ring gear 32 connected to a drive shaft 35 and coupled to a rotor of the motor generator MG2 via a speed reducer 36, and a planetary carrier 34 by which a plurality of pinion gears 33 is rotatably supported. The planetary carrier 34 is coupled to a crankshaft (output shaft) of the engine 10 via a damper 28. The drive shaft 35 is coupled to right and left wheels (drive wheels) DW via a gear mechanism (not illustrated) and a differential gear 39. Note that the speed reducer 36 may be replaced with a stepped transmission configured to select the speed ratio between the rotational speed of the rotor of the motor generator MG2 and the rotational speed of the drive shaft 35, from a plurality of speed ratios.

The motor generator MG1 serves mainly as an electricity generator that generates electricity with the use of at least part of the power from the engine 10 operated under load conditions. The motor generator MG2 serves mainly as an electric motor that generates power by being driven with at least one of electricity from the electricity storage device 40 and electricity from the motor generator MG. The motor generator MG2 outputs regenerative braking torque at the time of braking of the hybrid vehicle 1. The motor generators MG1, MG2 are configured to supply electricity to the electricity storage device 40 via the PCU 50 or to be supplied with electricity from the electricity storage device 40 via the PCU 50.

The electricity storage device 40 is one of a lithium-ion secondary battery and a nickel-hydride secondary battery, each having a rated output voltage of, for example, 200 V to 300 V. The electricity storage device 40 is managed by a power supply management electronic control unit (hereinafter, referred to as "power supply management ECU") 45 including a microcomputer that includes a CPU and so forth (not illustrated). The power supply management ECU 45 calculates, for example, a state-of-charge (SOC), a permissible charging electricity Win, and a permissible discharging electricity Wout of the electricity storage device 40, based on a voltage VB across terminals from a voltage sensor of the electricity storage device 40, a charging-discharging current IB from an electric current sensor of the electricity storage device 40, a battery temperature Tb from a temperature sensor of the electricity storage device 40 and so forth. The electricity storage device 40 may be a capacitor or may include both a secondary battery and a capacitor.

The hybrid vehicle 1 according to the present embodiment is a plug-in hybrid vehicle configured such that the electricity storage device 40 can be charged with electricity from an external power source 100, such as a household power source. The hybrid vehicle 1 includes a charging unit 47 connected to electric lines that connect the electricity storage device 40 and the PCU 50 to each other. The charging unit 47 includes, for example, an AC-DC converter that converts alternating-current (AC) power from the external power source 100, which is supplied via a power supply plug, into direct-current (DC) power, and a DC-DC converter that adjusts the voltage of the DC power from the AC-DC converter and supplies the DC power with an adjusted voltage to the electricity storage device 40 (both are not illustrated). In the present embodiment, the charging unit 47 is controlled by the HVECU 70.

The PCU 50 includes, for example, a first inverter 51 that drives the motor generator MG1, a second inverter 52 that drives the motor generator MG2, and a boost converter (voltage conversion module) 53 configured to boost the voltage of electricity from the electricity storage device 40 and lower the voltage of electricity from the motor generators MG1, MG2-side. The PCU 50 is controlled by a motor electronic control unit (hereinafter, referred to as a "MGECU") 55 including a microcomputer that includes a CPU and so forth (not illustrated). The MGECU 55 receives a command signal from the HVECU 70, and signals indicating a voltage before boosting by the boost converter 53, a voltage after boosting by the boost converter 53, detected values obtained by resolvers (not illustrated) that detect rotational positions of the rotors of the motor generators MG1, MG2, phase currents applied to the motor generators MG1, MG2 and so forth. Based on these input signals, the MGECU 55 executes switching control on the first and second inverters 51, 52 and the boost converter 53. The MGECU 55 also calculates rotational speeds Nm1, Nm2 of the rotors of the motor generators MG1, MG2 based on the detected values obtained by the resolvers.

The HVECU 70 includes a microcomputer that includes, for example, a CPU, a read-only memory (ROM), a random-access memory (RAM), and an input-output device (not illustrated). The HVECU 70 exchanges various kinds of signals with, for example, the engine ECU 15, the power supply management ECU 45, and MGECU 55 through a network (CAN). The HVECU 70 also receives a signal from a start switch (ignition switch) 80 configured to issue an instruction to activate a system of the hybrid vehicle 1, and signals indicating a shift position SP of a shift lever 82, which is detected by a shift position sensor 81, an accelerator depression amount Acc indicating a depression amount of an accelerator pedal 84, which is detected by an accelerator pedal position sensor 83, a vehicle speed V detected by a vehicle speed sensor 85, the rotational speeds Nm1, Nm2 of the motor generators MG1, MG2 from the MGECU 55 and so forth.

When the hybrid vehicle 1 is traveling, the HVECU 70 sets a required torque (required braking torque) Tr* that should be output from the power generation apparatus 20 to the drive shaft 35, based on the accelerator depression amount Acc and the vehicle speed V, and also sets a required traveling power Pd* required for traveling of the hybrid vehicle 1, based on the required torque Tr* and a rotational speed Nr of the drive shaft 35. Further, the HVECU 70 determines whether or not to operate the engine 10 under load conditions, based on the required torque Tr*, the required traveling power Pd*, a target charging-discharging electricity Pb* of the electricity storage device 40, the permissible discharging electricity Wout of the electricity storage device 40 and so forth. When the HVECU 70 determines that the engine 10 is to be operated under load conditions, the HVECU 70 sets a target power Pe* of the engine 10 such that the engine 10 is operated efficiently, based on the required power P*, the target charging-discharging electricity Pb* and so forth, and also sets a target engine speed Ne* of the engine 10 corresponding to the target power Pe*. Further, the HVECU 70 sets torque commands Tm1*, Tm2* for the motor generators MG1, MG2 such that the torque commands Tm1*, Tm2* correspond to the required torque Tr*, the target engine speed Ne* and so forth. On the other hand, when the HVECU 70 determines that the operation of the engine 10 is to be stopped, the HVECU 70 sets each of the target power Pe*, the target engine speed Ne*, and the torque command Tm1* to a value of zero, and also sets the torque command Tm2* such that a torque corresponding to the required torque Tr* is output from the motor generator MG2 to the drive shaft 35.

Then, the HVECU 70 transmits the target power Pe* and the target engine speed Ne* to the engine ECU 15, and transmits the torque commands Tm1*, Tm2* to the MGECU 55. The engine ECU 15 executes intake air amount control, fuel injection control, ignition timing control and so forth, based on the target power Pe* and the target engine speed Ne*. The MGECU 55 executes switching control on the first and second inverters 51, 52 and the boost converter 53 based on the torque commands Tm1*, Tm2*. While the engine 10 is operated under load conditions, the motor generators MG1, MG2 are controlled to carry out torque conversion on part of (at the time of charging) or the entirety of (at the time of discharging) the power output from the engine 10, in cooperation with the planetary gear mechanism 30, and to output the power, which has undergone the torque conversion, to the drive shaft 35. Thus, the hybrid vehicle 1 travels (HV traveling) using the power (directly transmitted torque) from the engine 10 and the power from the motor generator MG2. On the other hand, while the operation of the engine 10 is stopped, the hybrid vehicle 1 travels (EV traveling) using the power from the motor generator MG2.

Further, the HVECU 70 sets one of a CD mode and a CS mode as a traveling mode of the hybrid vehicle 1, based on the SOC of the electricity storage device 40. In the CD mode, consumption of the electricity accumulated in the electricity storage device 40 is promoted by giving a higher priority to EV traveling in which the operation of the engine 10 is stopped, than to HV traveling in which the engine 10 is operated. In the CS mode, a higher priority is given to HV traveling than to EV traveling. As described above, in the plug-in hybrid vehicle 1 including the electricity storage device 40 that can be charged with electricity from the external power source 100, the traveling mode can be set to one of the CD mode and the CS mode. Thus, it is possible to increase the opportunities to carry out EV traveling, thereby further improving the fuel efficiency.

Specifically, when the SOC of the electricity storage device 40 has exceeded a first threshold Sref1 set in advance (for example, a value of about 45% to 55%) at the time of system activation (for example, immediately after the electricity storage device 40 is charged with electricity from the external power source 100), the HVECU 70 sets the value of a traveling mode flag Fm to one, thereby setting the traveling mode to the CD mode. Further, while the traveling mode is the CD mode, the HVECU 70 sets a start determination power Pdref, which is a threshold to be compared with the required traveling power Pd* in a start determination on the engine 10, to a significantly large value (for example, infinite). When the required traveling power Pd* is smaller than the start determination power Pdref, the HVECU 70 maintains the engine 10 in a stopped state. Thus, while the traveling mode is set to the CD mode, it is possible to substantially prohibit the operation of the engine 10 and give a higher priority to EV traveling than to HV traveling. Even while the traveling mode is the CD mode, when the power that should be output from the motor generator MG2 exceeds the permissible discharging electricity Wout of the electricity storage device 40 or when the torque that should be output from the motor generator MG2 exceeds the rated torque of the motor generator MG2, the engine 10 is started up, so that the torque from the engine 10 is output to the drive shaft 35.

When the SOC of the electricity storage device 40 becomes equal to or lower than a second threshold Sref2 (for example, a value of about 25% to 35%) that is lower than the first threshold Sref1 while the hybrid vehicle 1 is traveling in the CD mode, the HVECU 70 sets the value of the traveling mode flag Fm to zero, thereby switching the traveling mode from the CD mode to the CS mode. Further, based on the SOC at the time when the traveling mode is switched from the CD mode to the CS mode, the HVECU 70 basically sets a control center value Sec, which is a target value of the SOC, within a range from a lower limit S0 set in advance (for example, 20%) to an upper limit S1 (for example, 80%). Then, while the CS mode is set as the traveling mode, the engine 10 and the motor generators MG1, MG2 are controlled, that is, the power generation apparatus 20 is controlled, such that the SOC of the electricity storage device 40 falls within the prescribed range centered on the control center value Sec (such that the SOC approaches the control center value Scc).

Figure 2:
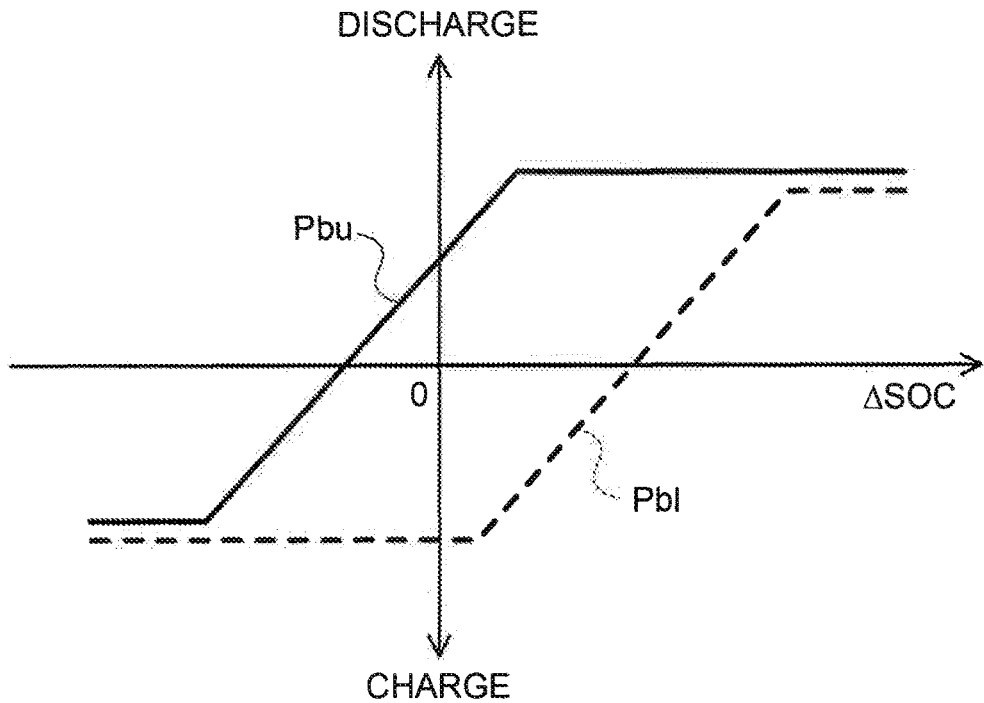
FIG. 2 is an explanatory diagram illustrating an example of a map used to set an upper limit and a lower limit of the target charging-discharging electricity of an electricity storage device in the hybrid vehicle in FIG. 1.

While the traveling mode is the CS mode, the HVECU 70 sets an upper limit charging-discharging electricity Pbu and a lower limit charging-discharging electricity Pbl of the charging-discharging electricity of the electricity storage device 40 based on the SOC, with reference to a map illustrated as an example in FIG. 2, and also sets the target charging-discharging electricity Pb*, which enables the engine 10 to operate efficiently, within a range between the upper limit charging-discharging electricity Pbu and the lower limit charging-discharging electricity Pbl. The map illustrated in FIG. 2 is created in advance so as to define the relationship between a difference ΔSOC between the SOC of the electricity storage device 40 and the control center value Scc (=SOC−Sc), the upper limit Pbu and lower limit Pbl, and is stored in the ROM (not illustrated) of the HVECU 70.

As indicated by a solid line in FIG. 2, the upper limit charging-discharging electricity Pbu is set, for example, in the following manner: when the difference ΔSOC is equal to or smaller than a first value (a negative value having a relatively large absolute value), the upper limit charging-discharging electricity Pbu is set to a relatively small negative constant value; when the difference ΔSOC is within a range between the first value and a second value (a relatively small positive value) larger than the first value, the upper limit charging-discharging electricity Pbu is set to increase as the ΔSOC increases; and when the difference ΔSOC is equal to or larger than the second value, the upper limit charging-discharging electricity Pbu is set to a relatively large positive constant value. Further, as indicated by a broken line in FIG. 2, the lower limit charging-discharging electricity Pbl is set, for example, in the following manner: when the difference ΔSOC is equal to or smaller than a third value (a positive value larger than the first value), the lower limit charging-discharging electricity Pbl is set to a relatively small negative constant value (for example, the same value as the negative constant value described above); when the difference ΔSOC is within a range between the third value and a fourth value (a positive value larger than the second value and the third value), the lower limit charging-discharging electricity Pbl is set to increase as ΔSOC increases; and when the difference ΔSOC is equal to or larger than the fourth value, the lower limit charging-discharging electricity Pbl is set to a relatively large positive constant value (for example, the same value as the positive constant value described above). Thus, while the traveling mode is the CS mode, the target charging-discharging electricity Pb* is increased toward the discharging-side as the difference ΔSOC increases (as the SOC becomes higher than the control center value Scc by a larger amount), whereas the target charging-discharging electricity Pb* is increased toward the charging-side as the difference ΔSOC decreases (as the SOC becomes lower than the control center value Scc by a larger amount).

Figure 3:
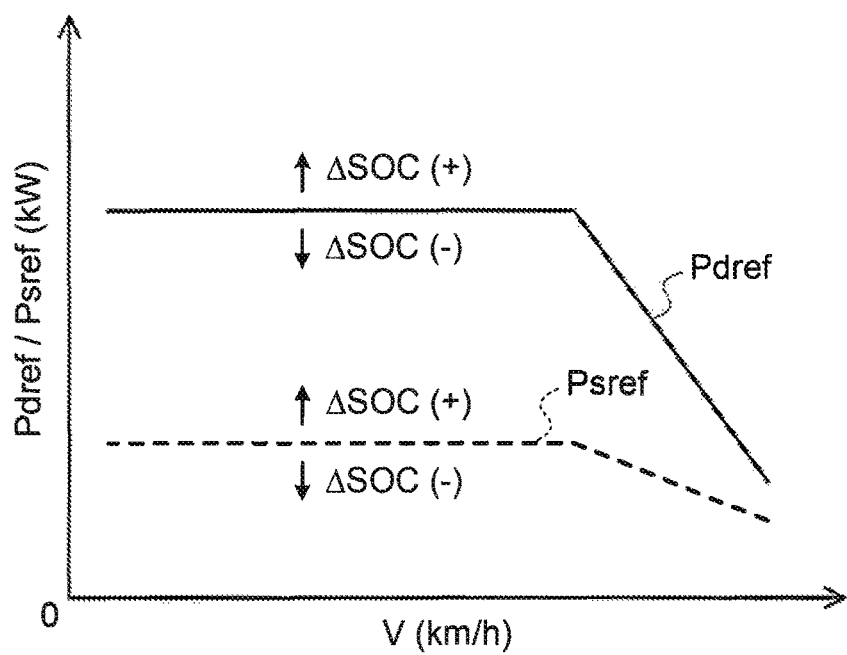
FIG. 3 is an explanatory diagram illustrating an example of each of a start determination power setting map and a stop determination power setting map used in the hybrid vehicle in FIG. 1.

Further, while the traveling mode is set to the CS mode, the HVECU 70 sets a start determination power Pdref, which is used in a start determination on the engine 10, from a start determination power setting map indicated by a solid line in FIG. 3, and sets a stop determination power Psref, which is used in a stop determination on the engine 10, from a stop determination power setting map indicated by a broken line in FIG. 3. The start determination power setting map and the stop determination power setting map are created in advance so as to define the relationship between the vehicle speed V and the difference ΔSOC, and the start determination power Pdref or the stop determination power Psref, and is stored in the ROM (not illustrated) of the HVECU 70.

The start determination power setting map illustrated in FIG. 3 is created such that, when the difference ΔSOC is constant, the start determination power Pdref is maintained at a constant value until the vehicle speed V reaches a relatively high prescribed vehicle speed, and after the vehicle speed V reaches the prescribed vehicle speed, the start determination power Pdref decreases as the vehicle speed V increases. Further, the start determination power setting map is created such that, as the difference ΔSOC increases, that is, as the SOC becomes higher than the control center value Sec by a larger amount, the start determination power Pdref increases, and as the difference ΔSOC decreases, that is, as the SOC becomes lower than the control center value Scc by a larger amount, the start determination power Pdref decreases. In addition, the stop determination power setting map illustrated in FIG. 3 is created such that the stop determination power Psref is smaller than the start determination power Pdref corresponding to the same vehicle speed, and the stop determination power Psref is changed in the same manner as that of a change in the start determination power Pdref. Note that the start determination power Pdref and the stop determination power Psref need not be defined based on the difference ΔSOC.

Further, in the present embodiment, a mode switch 88 (an example of "mode switch") is electrically connected to the HVECU 70. The mode switch 88 permits a driver to perform switching (selection) between the CD mode and the CS mode. Thus, the driver of the hybrid vehicle 1 can select a desired one of the CD mode and the CS mode as the traveling mode, by operating the mode switch 88. The HVECU 70 sets the value of the mode switch flag Fsw to one while the traveling mode is set to the CD mode, and sets the value of each of the mode switch flag Fsw and the traveling mode flag Fm to zero when the HVECU 70 determines that the driver has selected the CS mode based on a signal from the mode switch 88. Further, the HVECU 70 sets the value of the mode switch flag Fsw to zero while the traveling mode is set to the CS mode, and sets the value of each of the mode switch flag Fsw and the traveling mode flag Fm to one when the HVECU 70 determines that the driver has selected the CD mode. Further, as illustrated in FIG. 1, the HVECU 70 is connected to a controller of a display device 90 including a traveling mode display unit configured to display the set traveling mode (the CD mode or the CS mode), and provides various kinds of display command signals to the controller.

Figure 4:
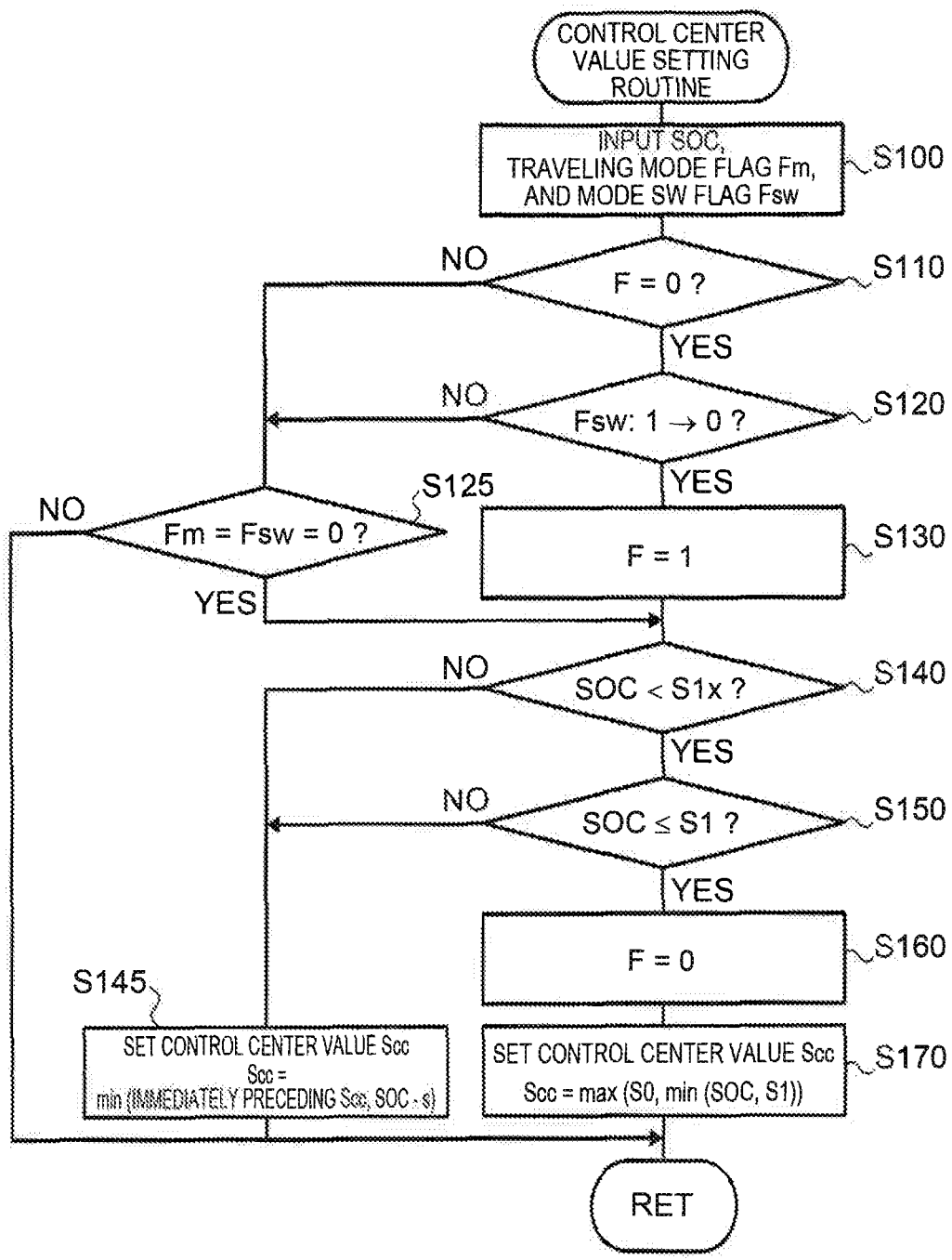
FIG. 4 is a flowchart illustrating an example of a control center value setting routine that is executed when a control center value of an SOC is set in the hybrid vehicle in FIG. 1.
Figure 5:
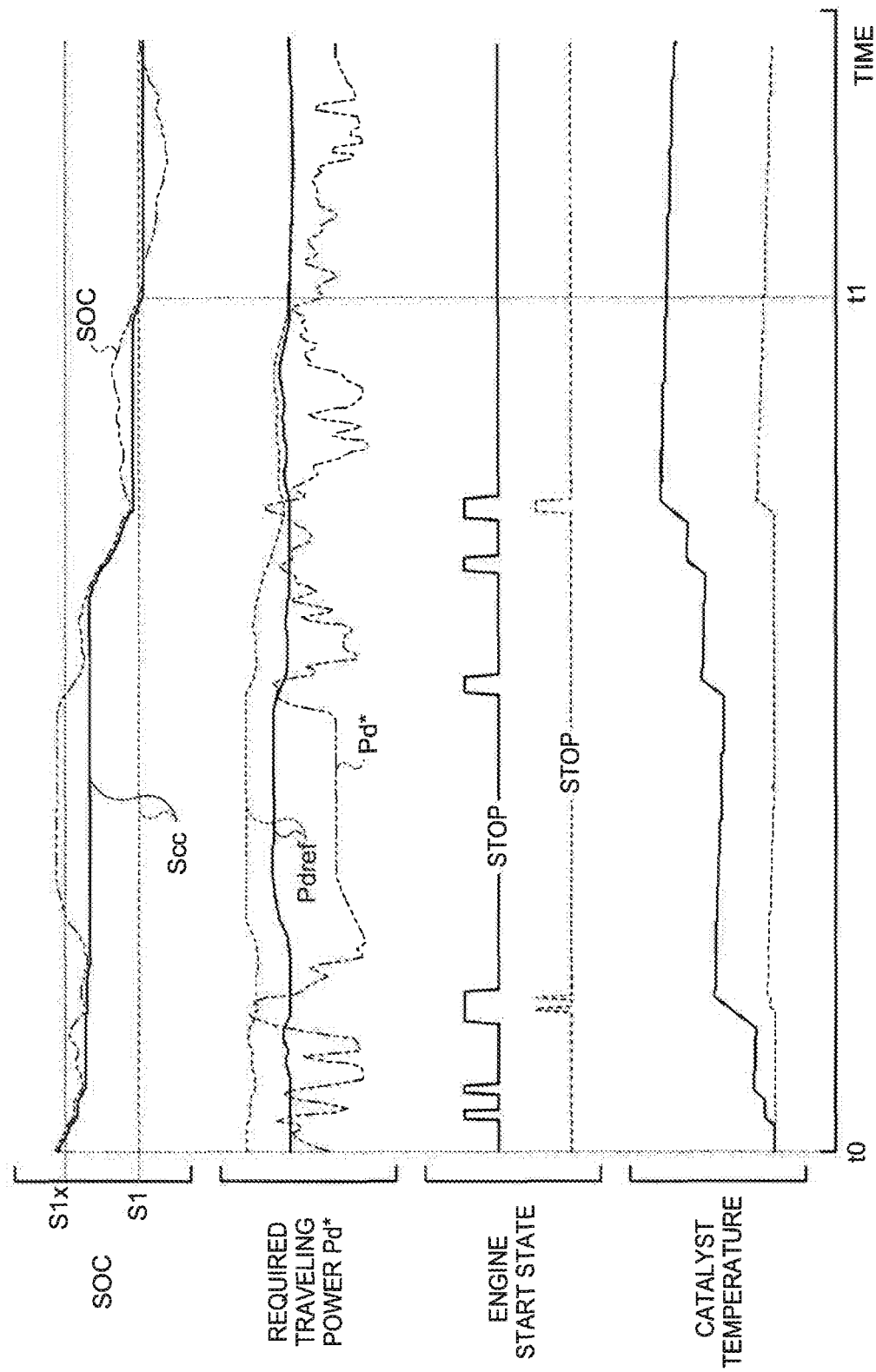
FIG. 5 is a time-series chart illustrating an example of temporal variation in each of the SOC of the electricity storage device, a required traveling power, an engine start state, and a catalyst temperature, when the traveling mode is switched from the CD mode to the CS mode by a driver in the hybrid vehicle in FIG. 1.

Next, the procedure of setting the control center value Sec in the hybrid vehicle 1 will be described with reference to FIG. 4 and FIG. 5. FIG. 4 is a flowchart illustrating an example of a control center value setting routine that is executed repeatedly at prescribed time intervals (every several milliseconds, for example) by the HVECU 70 while the system of the hybrid vehicle 1 is activated after the start switch 80 is turned on by a driver.

At the start of the routine in FIG. 4, the HVECU 70 (CPU) first receives data necessary for setting the control center value Scc, such as the SOC of the electricity storage device 40 from the power supply management ECU 45, a value of the traveling mode flag Fm, and a value of the mode switch flag Fsw (step S100). Then, the HVECU 70 determines whether or not the value of a prescribed flag F (initial value: zero) is zero (step S1110). When the HVECU 70 determines that the value of the flag F is zero (step S10: YES), the HVECU 70 determines whether or not the value of the mode switch flag Fsw has been changed from one to zero, that is, whether or not the driver has operated the mode switch 88 to switch the traveling mode from the CD mode to the CS mode (step S120).

When the HVECU 70 determines in step S120 that the value of the mode switch flag Fsw has been changed from one to zero and that the traveling mode has been switched from the CD mode to the CS mode by the driver (step S120: YES), the HVECU 70 sets the value of the flag F to one (step S130). Then, the HVECU 70 determines whether or not the SOC received in step S100 is lower than a prescribed threshold S1x (step S140). The threshold S1x used in step S140 is a value slightly higher (for example, 82%) than the upper limit S1 of the control center value Sec of the SOC. Note that, the HVECU 70 may determine, in step S140, whether or not the SOC received in step S100 has exceeded the upper limit S1 of the control center value Scc.

When the HVECU 70 determines in step S140 that the SOC is equal to or higher than the threshold Six and is higher than the upper limit S1 of the control center value Scc (step S140: NO), the HVECU 70 sets the control center value Scc based on the control center value Scc (immediately preceding value) set immediately before execution of the presently-executed routine (when the routine is executed last time) and the SOC received in step S100 (step S145). In step S145, the HVECU 70 sets, as the control center value Scc, a smaller one of the immediately preceding value of the control center value Scc and a value obtained by subtracting a prescribed value s (for example, a value of about 1% to 2%) from the SOC received in step S100.

After execution of the process in step S145, the HVECU 70 ends the routine. When the next execution timing comes, the HVECU 70 executes the process in step S100 and the subsequent processes again. Once the value of the flag F is set to one in step S130 as described above, a negative determination is made in step S110. In this case, the HVECU 70 skips the processes in step S120 and step S130, and determines whether or not the value of each of the traveling mode flag Fm and the mode switch flag Fsw is zero, that is, whether or not the traveling mode is the CS mode (step S125). When the HVECU 70 determines in step S120 that the value of the mode switch flag Fsw has not been changed or that the value of the mode switch flag Fsw has been changed from zero to one (step S120: NO), the HVECU 70 executes the determination process in step S125. When the HVECU 70 determines in step S125 that the value of each of both the traveling mode flag Fm and the mode switch flag Fsw is not zero, the HVECU 70 ends the routine and executes a process of switching to the CD mode.

When the HVECU 70 determines in step S125 that the value of each of the traveling mode flag Fm and the mode switch flag Fsw is zero and that the traveling mode is the CS mode (step S125: YES), the HVECU 70 determines whether or not the SOC received in step S100 is lower than the threshold Six (step S140). When the HVECU 70 determines that the SOC is equal to or higher than the threshold Six (step S140: NO), the HVECU 70 sets, as the control center value Scc, a smaller one of the immediately preceding value of the control center value Sec and a value obtained by subtracting the prescribed value s from the present value of the SOC (step S145), and ends the routine. When the HVECU 70 determines in step S140 that the SOC is lower than the threshold S1x (step S140: YES), the HVECU 70 then determines whether or not the SOC received in step S100 is equal to or lower than the upper limit S1 of the control center value Scc (step S150). When the HVECU 70 determines that the SOC is higher than the upper limit S1 (step S150: NO), the HVECU 70 sets, as the control center value Scc, a smaller one of the immediately preceding value of the control center value Scc and a value obtained by subtracting the prescribed value s from the present value of the SOC (step S145), and ends the routine.

On the other hand, when the HVECU 70 determines in step S150 that the SOC is equal to or lower than the upper limit S1 (step S150: YES), the HVECU 70 sets (resets) the value of the flag F to zero (step S160), and subsequently, sets the control center value Sec based on the SOC received in step S100, the upper limit S1, and the lower limit S0 (step S170). In step S170, the HVECU 70 sets, as the control center value Scc, a larger one of the lower limit S0 and a value which is a smaller one of the SOC received in step S100 and the upper limit S1 (Scc=max(S0, min(S1, SOC at the time of switching))). After executing the process in step S170, the HVECU 70 ends the routine. When the next execution timing comes, the HVECU 70 executes the processes in step S100 and subsequent processes again.

As a result of execution of the control center value setting routine in FIG. 4, in response to switching of the traveling mode to the CS mode performed by the driver when the SOC of the electricity storage device 40 is higher than the upper limit S1 of the control center value Scc while the traveling mode is the CD mode (at time t0 in an SOC time-series chart in FIG. 5), the control center value Scc is set to a value (basically, the present SOC-s), which is equal to or higher than the upper limit S1, based on the SOC at the time when the traveling mode is switched to the CS mode (step S145). Until the control center value Scc becomes equal to or lower than the upper limit S1 after switching of the traveling mode to the CS mode performed by the driver, the control center value Sc is decreased over time based on the prescribed value s (step S145). After the control center value Scc becomes equal to or lower than the upper limit S1 (at time t1 in the SOC time-series chart in FIG. 5), the upper limit S1 is set as the control center value Scc (step S190).

In this way, the control center value Sec is decreased over time, after being set to a value equal to or higher than the upper limit S1 based on the SOC at the time when the traveling mode is switched to the CS mode, in response to switching of the traveling mode to the CS mode performed by the driver. As a result, an increase in the difference ΔSOC between the SOC and the control center value Scc can be suppressed. Thus, as indicated by a solid line in the required traveling power Pd* time-series chart in FIG. 5, the start determination power Pdref for the engine 10 set based on the vehicle speed V and the difference ΔSOC from the start determination power setting map in FIG. 3, is smaller than the start determination power Pdref (see a broken line in the required traveling power Pd* time-series chart in FIG. 5) when the control center value See is set to the upper limit S1 in response to switching of the traveling mode to the CS mode performed by the driver. In FIG. 5, the solid lines indicate the changes in the respective parameters caused when the routine in FIG. 4 is executed, and the broken lines indicate the changes in the respective parameters caused when the control center value See is set to the upper limit S1 in response to switching of the traveling mode to the CS mode performed by the driver.

In the hybrid vehicle 1, the power generation apparatus 20 (the engine 10 and the motor generators MG1, MG2) is controlled by the HVECU 70 (and the engine ECU 15 and the MG ECU 55) such that the engine 10 is started up with a higher frequency when the driver switches the traveling mode from the CD mode to the CS mode while the SOC is higher than the upper limit S1 of the control center value Sc (step S140: NO), than when the driver switches the traveling mode from the CD mode to the CS mode while the SOC is equal to or lower than the upper limit S1 (step S140: YES, step S150: YES), as illustrated in the required traveling power Pd* time-series chart and the engine start state time-series chart in FIG. 5. When the engine 10 is once started up after the driver switches the traveling mode from the CD mode to the CS mode, an interval at which the engine 10 is started up becomes shorter, whereby the temperature of the exhaust gas catalyst 11c can be kept high, as illustrated in the engine start state time-series chart and the catalyst temperature time-series chart in FIG. 5. Consequently, in the hybrid vehicle 1, it is possible to suppress reduction in the exhaust gas control performance when the driver switches the traveling mode from the CD mode to the CS mode. Furthermore, an increase in the difference ΔSOC is suppressed, and thus, the target charging-discharging electricity Pb*, which is set based on the map in FIG. 2, increases toward the charging-side. Consequently, the engine 10 is more likely to be started up, and further, a load (work) of the engine 10 that has been started up is increased to promote an increase in the temperature of the exhaust gas catalyst 11c.

Moreover, in the hybrid vehicle 1, the control center value Sec is decreased over time from a value equal to or higher than the upper limit S1 in response to switching of the traveling mode to the CS mode performed by the driver, and the control center value Sec is set to the upper limit S1 when the control center value Scc becomes equal to or lower than the upper limit S1. Thus, the SOC is gradually decreased, whereby the engine 10 is more likely to be started up. Further, even after the SOC becomes equal to or lower than the upper limit S1 of the control center value Sec, it is possible to respond to the driver's needs to maintain the SOC of the electricity storage device at a high level by switching the traveling mode from the CD mode to the CS mode.

Note that the threshold used in step S140 in FIG. 4 is not limited to the threshold Six that is higher than the upper limit S1 of the control center value Scc of the SOC. The threshold used in step S150 in FIG. 4 is not limited to the upper limit S1. That is, step S140 in FIG. 4 may be a step for determining whether or not the SOC of the electricity storage device 40 is within a prescribed high SOC range. Step S150 in FIG. 4 may be a step for determining whether or not the SOC is within a lower SOC range that is on the lower side of the high SOC range. Further, the hybrid vehicle 1 may include a transmission mechanism (stepped transmission) provided between the drive shaft 35 and the differential gear 39. Further, the hybrid vehicle 1 may be a non-plug-in hybrid vehicle, as long as the traveling mode can be set to either the CD mode or the CS mode. Further, instead of the mode switch 88, a mode switch that permits the driver to perform switching (selection) between the CD mode and the CS mode may be provided on the screen of the display device 90.

In step S145 in FIG. 4, a smaller one of the immediately preceding value of the control center value Scc and a value obtained by subtracting the prescribed value s from the SOC (the present value) received in step S100 is set as the control center value Scc. However, step S145 is not limited to this. That is, in step S145 in FIG. 4, a smaller one of the immediately preceding value of the control center value Sec and the SOC (the present value) received in step S100 may be set as the control center value Sec. In this way, even when a smaller one of the immediately preceding value of the control center value Sec and present value of the SOC is set as the control center value Sec at intervals of a prescribed time after the driver performs switching to the CS mode, the control center value Scc can be decreased over time.

Figure 6:
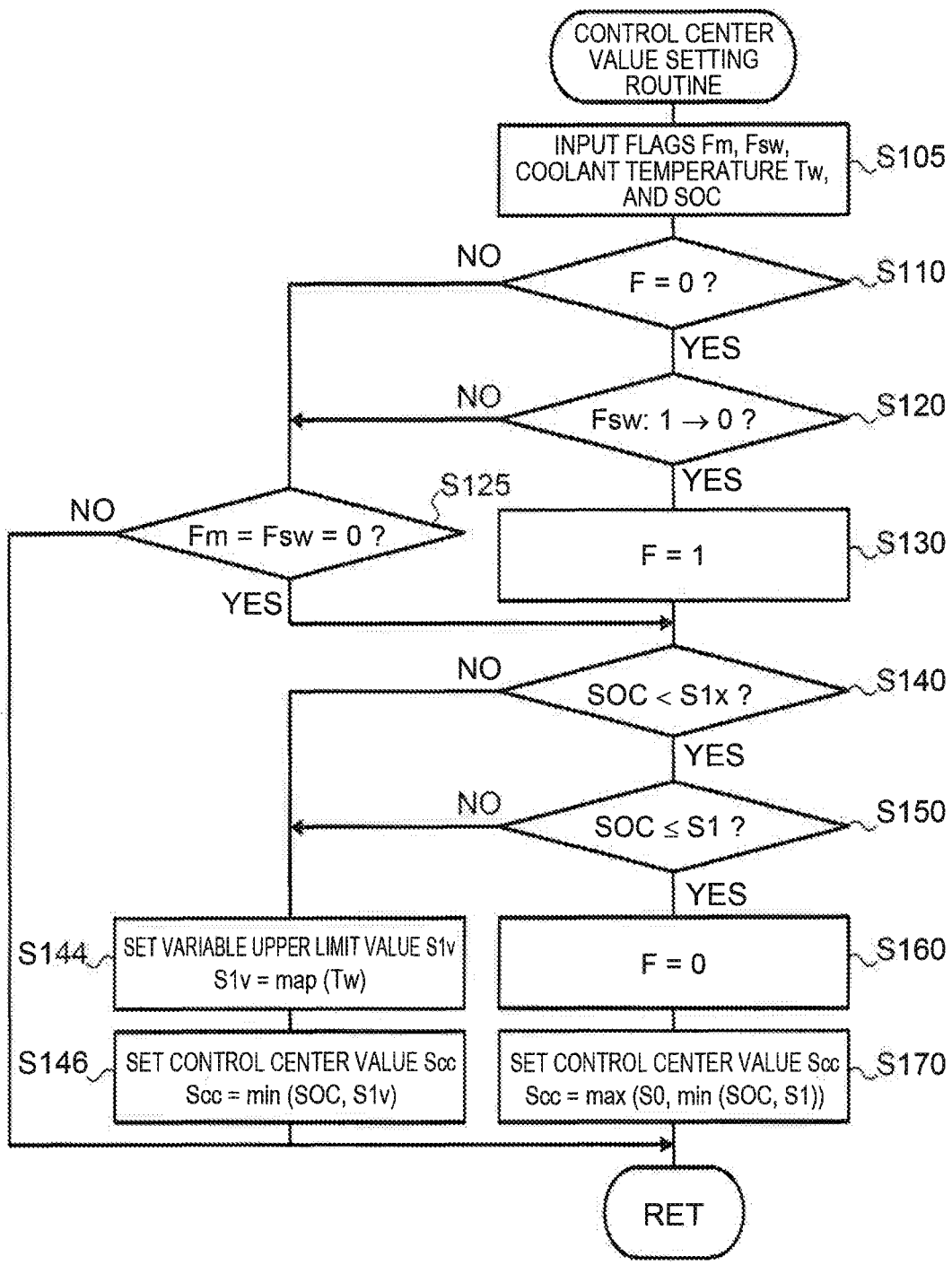
FIG. 6 is a flowchart illustrating another control center value setting routine that may be executed in the hybrid vehicle in FIG. 1.

FIG. 6 is a flowchart illustrating another control center value setting routine that may be executed by the HVECU 70 of the hybrid vehicle 1. The control center value setting routine in FIG. 6 corresponds to a routine obtained by replacing step S100 with step S105 and by replacing step S145 with steps S144 and S146 in the routine in FIG. 4. In step S105 in FIG. 6, the HVECU 70 receives a coolant temperature Tw in the engine 10 detected by a coolant temperature sensor (not illustrated) from the engine ECU 15, in addition to the SOC of the electricity storage device 40 and the values of the traveling mode flag Fm and the mode switch flag Fsw.

Figure 7:
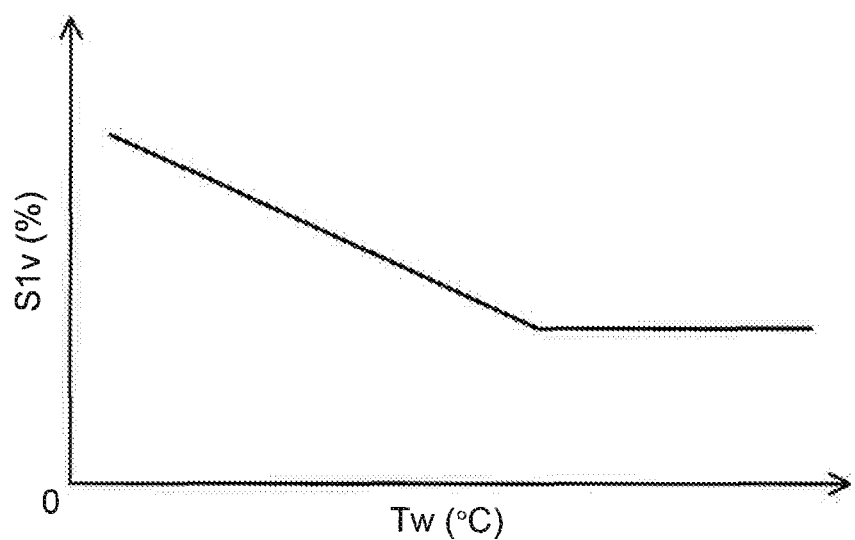
FIG. 7 is an explanatory diagram illustrating an example of a variable upper limit setting map used to set the control center value of the SOC in the hybrid vehicle in FIG. 1.

When the HVECU 70 determines in step S140 that the SOC is equal to or higher than the threshold Six, or determines that in step S150 that the SOC is higher than the upper limit S1, the HVECU 70 sets a variable upper limit Sly, which is an upper limit of the control center value Scc and which corresponds to the coolant temperature Tw received in step S100, based on a variable upper limit setting map illustrated in FIG. 7 (step S144). The variable upper limit setting map is created in advance so as to define the relationship between the coolant temperature Tw and the variable upper limit Sly as illustrated in FIG. 7, and is stored in the ROM (not illustrated) of the HVECU 70.

As illustrated in FIG. 7, the variable upper limit setting map is created such that the variable upper limit Sly becomes higher as the coolant temperature Tw having a correlation with the temperature (bed temperature) of the exhaust gas catalyst 11c becomes lower, and the variable upper limit Sly is set to a constant value when the coolant temperature Tw is equal to or higher than a prescribed value. The HVECU 70 sets, as the control center value Scc, a smaller one of the SOC (the present value) received in step S100 and the variable upper limit Sly set in step S144 (step S146). Thus, until the SOC becomes equal to or lower than the upper limit S1 of the control center value Sec after the driver switches the traveling mode from the CD mode to the CS mode while the SOC is higher than the upper limit S1 of the control center value Scc, the control center value Sc is set so as not to exceed the variable upper limit Sly (the upper limit of the control center value Scc), which becomes lower over time with an increase in the temperature of the exhaust gas catalyst 11c. As a result, the control center value Scc can be decreased over time. The variable upper limit setting map may be created in advance so as to define the relationship between the variable upper limit Sly and an estimated or actually measured temperature (bed temperature) of the exhaust gas catalyst 11c. In step S105 in FIG. 6, instead of the coolant temperature Tw, the estimated or actually measured temperature of the exhaust gas catalyst 11c may be received by the HVECU 70.

Figure 8:
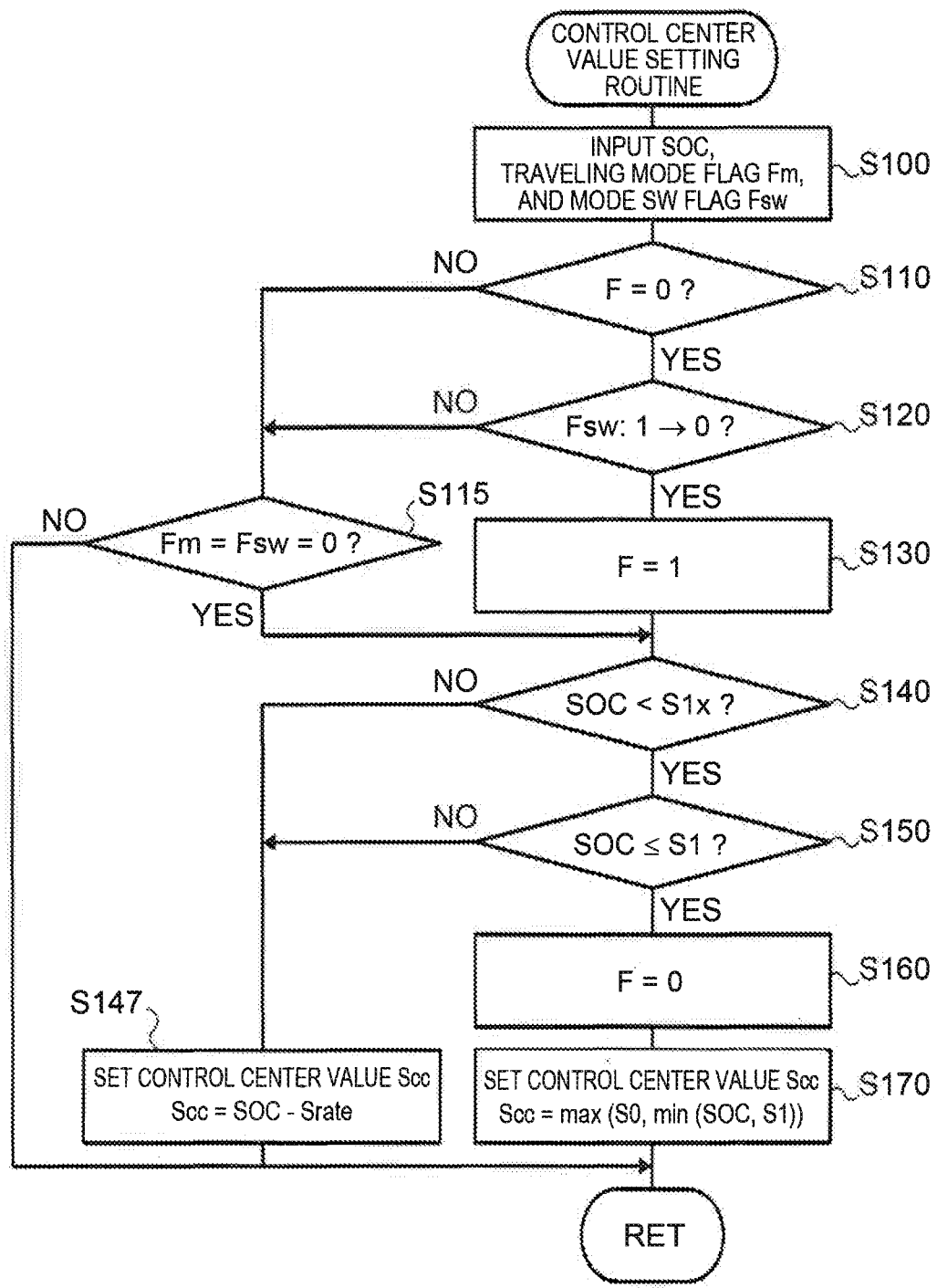
FIG. 8 is a flowchart illustrating another control center value setting routine that may be executed in the hybrid vehicle in FIG. 1.

FIG. 8 is a flowchart illustrating another control center value setting routine that may be executed by the HVECU 70 of the hybrid vehicle 1. The control center value setting routine in FIG. 8 corresponds to a routine obtained by replacing step S145 with step S147 in the routine in FIG. 4. In step S147 in FIG. 6, the HVECU 70 sets, as the control center value Scc, a value obtained by subtracting a prescribed rate value Srate (a positive value) from the SOC (the present value) received in step S100. Thus, until the SOC becomes equal to or lower than the upper limit S1 of the control center value Scc after the driver performs switching to the CS mode, the control center value Sc can be decreased over time at a rate of change corresponding to the rate value Srate.

Figure 9:
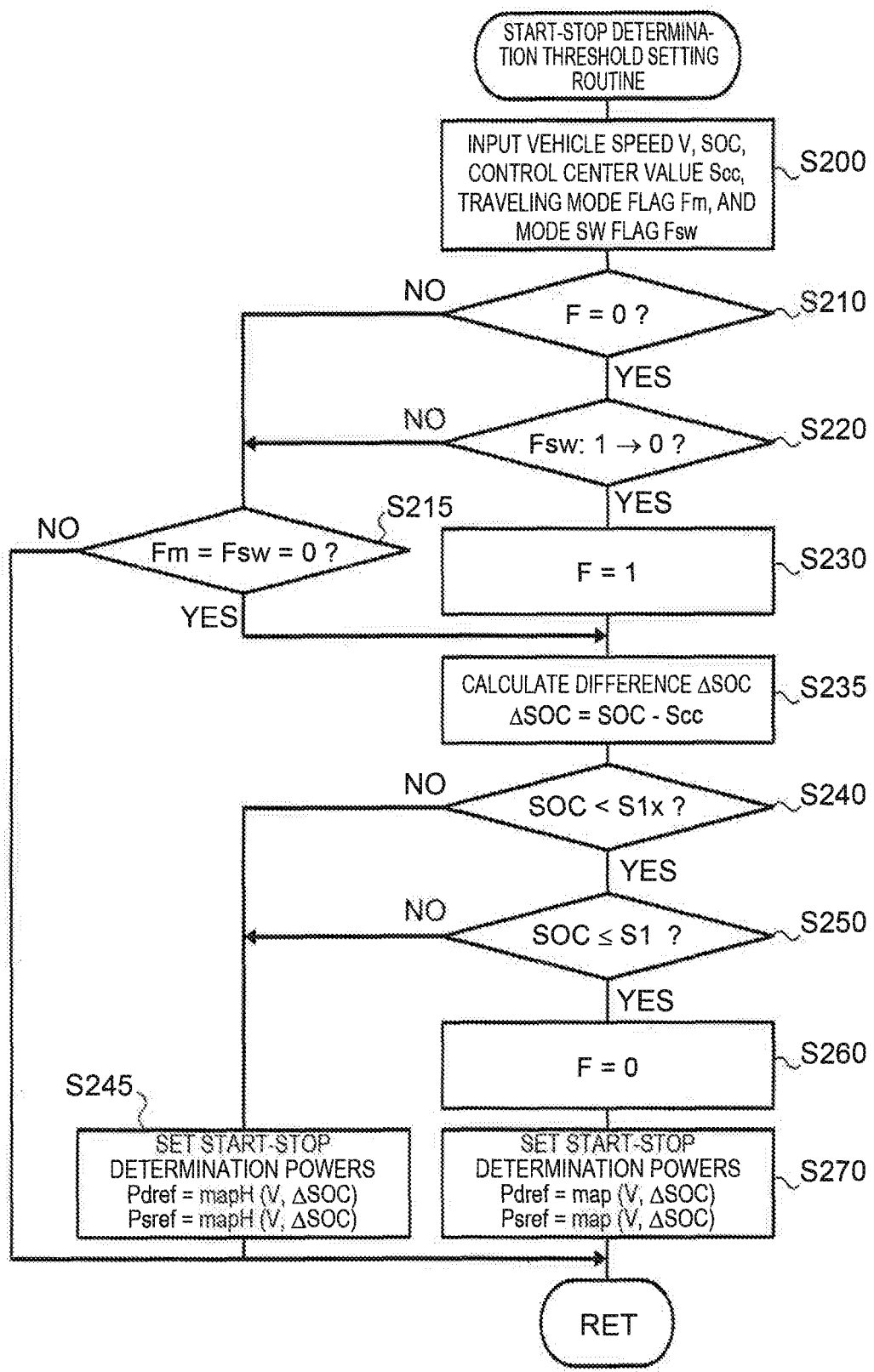
FIG. 9 is a flowchart illustrating a start-stop determination threshold setting routine that may be executed in the hybrid vehicle in FIG. 1.

FIG. 9 is a flowchart illustrating a start-stop determination threshold setting routine that may be executed by the HVECU 70 of the hybrid vehicle 1. In the start-stop determination threshold setting routine in FIG. 9, processes in steps S210 to S230 are identical to those in steps S110 to S130 in FIG. 4, and processes in steps S240 to S260 are identical to those in steps S140 to S160 in FIG. 4. In step S200 in FIG. 9, the HVECU 70 receives the vehicle speed V from the vehicle speed sensor 85, the SOC of the electricity storage device, the control center value Scc, and the values of the traveling mode flag Fm and the mode switch flag Fsw. In this case, the control center value Scc is set within the range from the lower limit S0 to the upper limit S1 based on the SOC at the time of switching of the traveling mode from the CD mode to the CS mode (which may be performed by a driver). At a time after the process in step S215 or step S230 and before the determination process in step S240, the HVECU 70 calculates the difference ΔSOC by subtracting the control center value Sec from the SOC received in step S200 (step S235).

Figure 10:
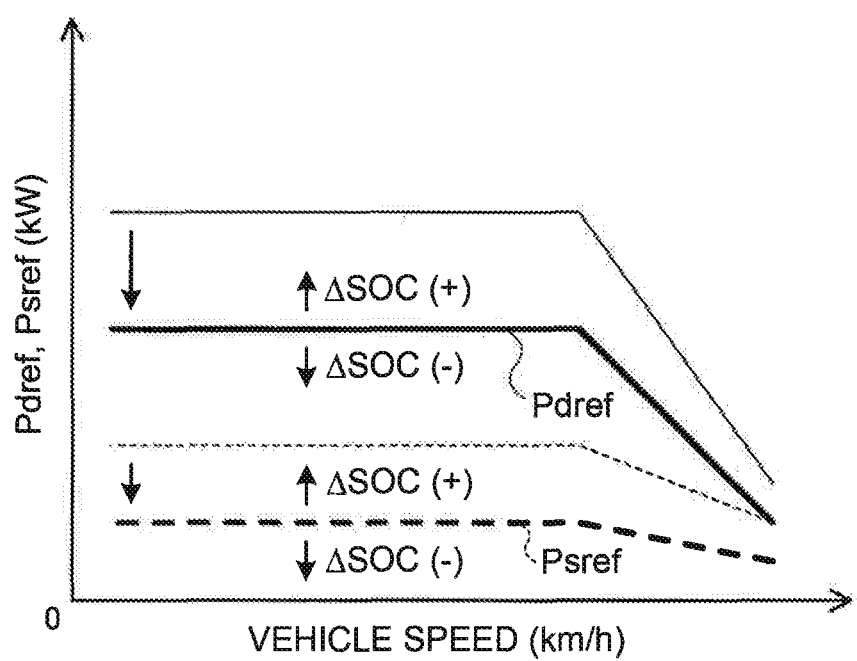
FIG. 10 is an explanatory diagram illustrating a start determination power setting map and a stop determination power setting map that are used when the traveling mode is switched from the CD mode to the CS mode by a driver.

Moreover, when the HVECU 70 determines in step S240 that the SOC is equal to or higher than the threshold Six or determines in step S250 that the SOC is higher than the upper limit S1, the HVECU 70 sets the start determination power Pdref and the stop determination power Psref for the engine 10, which correspond to the vehicle speed V and the difference ΔSOC, based on a start determination power setting map and a stop determination power setting map (step S245). The start determination power setting map and the stop determination power setting map are created in advance and stored in the ROM, so as to be used at the time of the high SOC. As indicated by a thick solid line in FIG. 10, in the start determination power setting map used at the time of the high SOC, the start determination power Pdref corresponding to a combination of the vehicle speed V and the difference ΔSOC is smaller than that corresponding to the combination of the same vehicle speed V and the same difference ΔSOC in the start determination power setting map indicated by the solid line in FIG. 3. As indicated by a thick broken line in FIG. 10, in the stop determination power setting map used at the time of the high SOC, the stop determination power Psref corresponding to a combination of the vehicle speed V and the difference ΔSOC is lower than that corresponding to the combination of the same vehicle speed V and the same difference ΔSOC in the stop determination power setting map indicated by the broken line in FIG. 3.

When the HVECU 70 determines in step S250 that the SOC is equal to or lower than the upper limit S1, the HVECU 70 sets the start determination power Pdref and the stop determination power Psref for the engine 10, which correspond to the vehicle speed V and the difference ΔSOC, based on the start determination power setting map and the stop determination power setting power used at normal times illustrated in FIG. 3 (step S270). Thus, the start determination power Pdref when the driver switches the traveling mode from the CD mode to the CS mode while the SOC is higher than the upper limit S1 of the control center value Scc, is smaller, in terms of the combination of the same vehicle speed V and the same difference ΔSOC, than the start determination power Pdref when the driver switches the traveling mode from the CD mode to the CS mode while the SOC is equal to or lower than the upper limit S1, until the control center value Scc becomes equal to or lower than the upper limit S1. Thus, the engine 10 is started up with a higher frequency. As a result, even when the routine in FIG. 9 is executed in the hybrid vehicle 1, it is possible to suppress reduction in the exhaust gas control performance when the driver switches the traveling mode from the CD mode to the CS mode.

Figure 11:
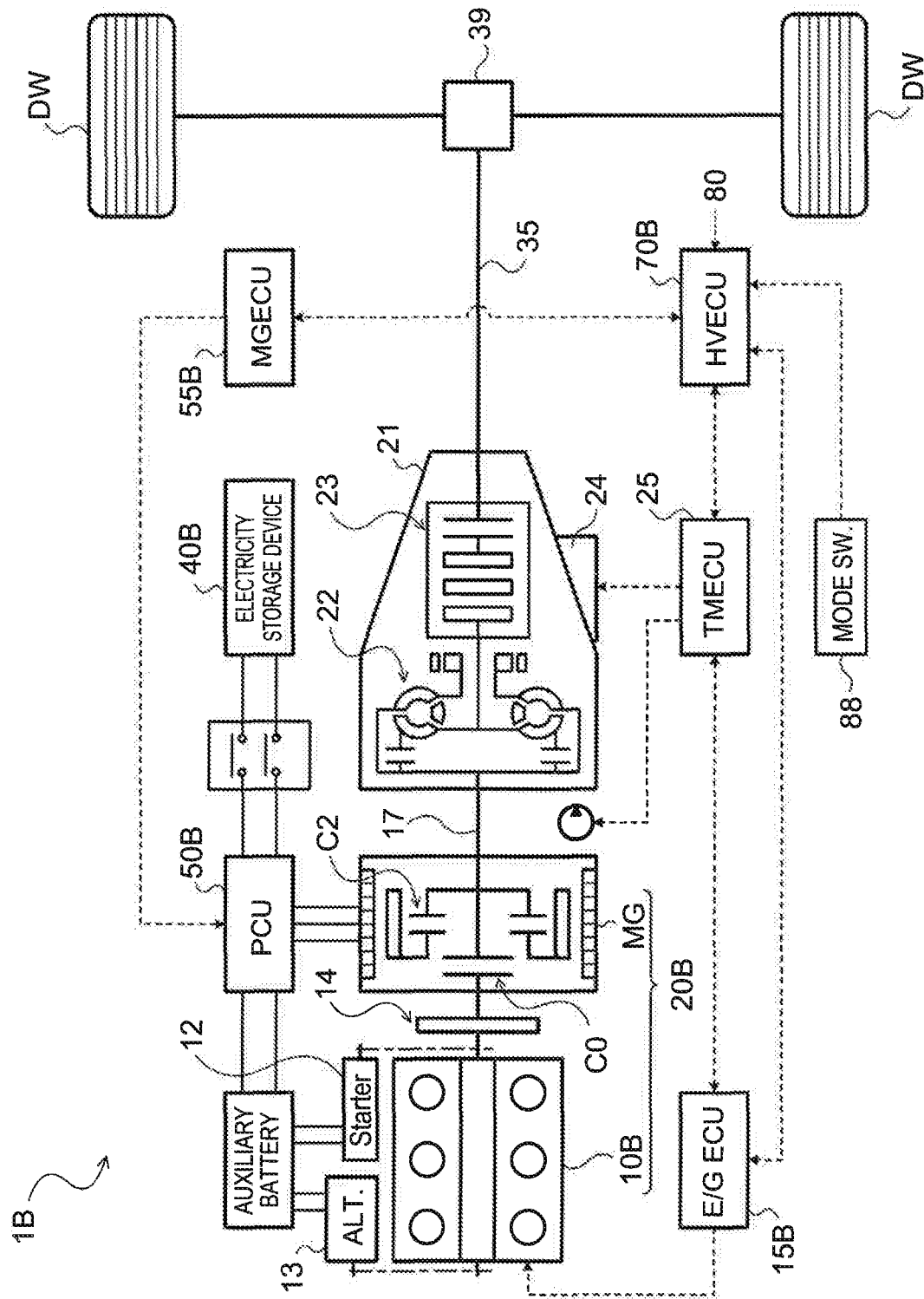
FIG. 11 is a diagram schematically illustrating the configuration of another hybrid vehicle according to the disclosure.

FIG. 11 is a diagram schematically illustrating the configuration of another hybrid vehicle 1B according to the disclosure. The hybrid vehicle 1B illustrated in FIG. 11 is a parallel hybrid vehicle including a power generation apparatus 20B that includes an engine 10B and a motor generator MG, a power transmission device 21, and a HVECU 70B serving as a controller that controls the entirety of the hybrid vehicle 1B.

The engine 10B is an internal combustion engine controlled by an engine ECU 15B, and is provided with an exhaust gas catalyst (not illustrated), a starter 12, an alternator 13 that is driven by the engine 10B to generate electricity, and so forth. The motor generator MG is a synchronous generator-motor configured to supply electricity to an electricity storage device 40B via a PCU 50B controlled by an MGECU 55B and to be supplied with electricity from the electricity storage device 40B via the PCU SOB. The motor generator MG is configured to generate electricity with the use of at least part of the power from the engine 10B. The power generation apparatus 20B includes, in addition to the engine 10B and the motor generator MG, a normally-disengaged clutch CO (first clutch) configured to connect a crankshaft of the engine 10B and a transmission shaft 17 to each other via a flywheel damper 14 and to disconnect the crankshaft of the engine 10B and the transmission shaft 17 from each other, and a normally-engaged clutch C2 (second clutch) configured to connect a rotor of the motor generator MG and the transmission shaft 17 to each other and to disconnect the rotor of the motor generator MG and the transmission shaft 17 from each other.

The power transmission device 21 includes a starting device 22 that includes a lock-up clutch, a torque converter (hydraulic power transmission), a damper device (not illustrated) and so forth, a mechanical oil pump, a transmission mechanism (automatic transmission) 23, a hydraulic control device 24 and so forth. The transmission mechanism 23 is a transmission having four to ten speeds and including a plurality of planetary gear mechanisms, a plurality of clutches (frictional engagement elements), and a plurality of brakes (frictional engagement elements). The transmission mechanism 23 is configured to change the speed of rotation transmitted from the transmission shaft 17 via the starting device 22 based on a speed ratio selected from a plurality of speed ratios, and to output the rotation with a changed speed to the drive shaft 35 serving as an output shaft. The hydraulic control device 24 is controlled by a transmission electronic control unit (hereinafter, referred to as "TMECU) 25 including a microcomputer that includes a CPU and so forth (not illustrated). The hydraulic control device 24 regulates the hydraulic pressure from a mechanical oil pump or an electric oil pump and supplies the regulated hydraulic pressure to the lock-up clutch and the clutches and the brakes of the transmission mechanism 23. The hydraulic pressure from the hydraulic control device 24 is also supplied to the clutches CO, C2 of the power generation apparatus 20B. The clutches CO, C2 are controlled by the TMECU 25 based on a command signal from the HVECU 70B.

The hybrid vehicle 1B configured as described above starts traveling with the use of the power from the motor generator MG in a state where the clutch CO is disengaged and the clutch C2 is engaged, after the system is activated. In the hybrid vehicle 1B as well, when the SOC of the electricity storage device 40B has exceeded a prescribed first threshold Sref1 at the time of activation of the system, the HVECU 70B sets the traveling mode to the CD mode. Further, when the SOC of the electricity storage device 40B becomes equal to or lower than a second threshold Sref2 that is lower than the first threshold Sref1 while the hybrid vehicle 1B is traveling in the CD mode, the HVECU 70B switches the traveling mode from the CD mode to the CS mode. Further, in the hybrid vehicle 1B as well, a mode switch (an example of a mode switch) 88 that permits a driver to perform switching (selection) between the CD mode and the CS mode is electrically connected to the HVECU 70B. The HVECU 70B executes a routine to set the control center value Scc in the same manner as the control center value setting routine, for example, in FIG. 4. Thus, in the hybrid vehicle LB as well, it is possible to produce the same advantageous effects as those in the hybrid vehicle 1.

Note that the hybrid vehicle 1B may be a plug-in hybrid vehicle configured such that the electricity storage device 40B can be charged with electricity from an external power source. The hybrid vehicle 1B may be a four-wheel-drive vehicle configured such that the power output to the drive shaft 35 is distributed to the front wheels and the rear wheels by a transfer (not illustrated).

As described above, the hybrid vehicle 1 (1B) according to the disclosure includes the power generation apparatus 20 (20B) that includes the engine 10 (10B) provided with the exhaust gas catalyst 11c (the exhaust gas catalyst) and the motor generators MG1, MG2 (the motor generator MG) configured to generate electricity with the use of at least part of the power from the engine 10 (10B), and the electricity storage device 40 (40B) configured to supply electricity to the motor generators MG1, MG2 (the motor generator MG) or to be supplied with electricity from the motor generators MG1, MG2 (the motor generator MG). In the hybrid vehicle 1 (1B), one of the CD mode and the CS mode can be selectively set as the traveling mode. The hybrid vehicle 1 (1B) includes the mode switch 88, which is an example of a mode switch that permits a driver to perform switching between the CD mode and the CS mode, and the HVECU 70 (70B) serving as a control device. The HVECU 70 (70B) controls the power generation apparatus 20 (20B) such that, when the driver switches the traveling mode from the CD mode to the CS mode while the SOC of the electricity storage device 40 (40B) is higher than the upper limit S1 of the control center value Sec in the CS mode, the engine 10 is started-up with a higher frequency than when the driver switches the traveling mode from the CD mode to the CS mode while the SOC is equal to or lower than the upper limit S1. Consequently, it is possible to suppress reduction in the exhaust gas control performance when the driver switches the traveling mode from the CD mode to the CS mode.

Further, the disclosure is not limited to the foregoing embodiments. It is needless to say that various modifications may be made within the scope of the disclosure. Further, each of the foregoing embodiments is merely an example of the disclosure, and does not limit the elements of the disclosure.

The disclosure is applicable to, for example, the hybrid vehicle manufacturing industry.

What is claimed is:

1. A hybrid vehicle configured such that one of a charge-depleting mode and a charge-sustaining mode is selectively set as a traveling mode, the hybrid vehicle comprising:
    a power generation apparatus including an engine and an electric motor, the engine being provided with an exhaust gas catalyst, and the electric motor being configured to generate electricity with use of at least part of power from the engine;
    an electricity storage device configured to supply electricity to the electric motor or to be supplied with electricity from the electric motor;
    a mode switch configured to permit a driver to perform switching between the charge-depleting mode and the charge-sustaining mode; and
    an electronic control unit configured to control the power generation apparatus such that a state-of-charge of the electricity storage device approaches a control center value that is equal to or lower than an upper limit set in advance, while the traveling mode is the charge-sustaining mode, and
    the electronic control unit being configured to control the power generation apparatus such that the engine is started up with a higher frequency when the driver switches the traveling mode from the charge-depleting mode to the charge-sustaining mode while the state-of-charge is higher than the upper limit of the control center value, than when the driver switches the traveling mode from the charge-depleting mode to the charge-sustaining mode while the state-of-charge is equal to or lower than the upper limit of the control center value,
    wherein the electronic control unit is configured to set the control center value to a value equal to or higher than the upper limit, based on the state-of-charge at a time of switching of the traveling mode to the charge-sustaining mode, when the driver switches the traveling mode to the charge-sustaining mode while the state-of-charge is higher than the upper limit of the control center value, and is configured to decrease the control center value over time.

2. The hybrid vehicle according to claim 1, wherein the electronic control unit is configured to decrease the control center value over time by setting, as the control center value, a smaller one of an immediately preceding value of the control center value and a present value of the state-of-charge at prescribed time intervals after the driver switches the traveling mode to the charge-sustaining mode.

3. The hybrid vehicle according to claim 1, wherein the electronic control unit is configured to decrease the control center value over time by setting, as the control center value, a smaller one of an immediately preceding value of the control center value and a value obtained by subtracting a prescribed value from a present value of the state-of-charge at prescribed time intervals after the driver switches the traveling mode to the charge-sustaining mode.

4. The hybrid vehicle according to claim 1, wherein the electronic control unit is configured to decrease the upper limit of the control center value over time and to set the control center value such that the control center value does not exceed the upper limit, after the driver switches the traveling mode to the charge-sustaining mode.

5. The hybrid vehicle according to claim 1, wherein the electronic control unit is configured to set the control center value such that the control center value is decreased at a prescribed rate of change after the driver switches the traveling mode to the charge-sustaining mode.

6. The hybrid vehicle according to claim 1, wherein the electronic control unit is configured to decrease the control center value over time until the control center value becomes equal to or lower than the upper limit after the driver switches the traveling mode to the charge-sustaining mode, and to set the upper limit as the control center value when the control center value becomes equal to or lower than the upper limit.

7. The hybrid vehicle according to claim 1, wherein
the electronic control unit is configured to start up the engine when a required traveling power required of the power generation apparatus is equal to or larger than a start determination power while the traveling mode is the charge-sustaining mode, and
the electronic control unit is configured to increase the start determination power as the state-of-charge is higher than the control center value and to decrease the start determination power as the state-of-charge is lower than the control center value.

8. The hybrid vehicle according to claim 1, wherein
the electronic control unit is configured to start up the engine when a required traveling power required of the power generation apparatus is equal to or larger than a start determination power corresponding to a vehicle speed while the traveling mode is the charge-sustaining mode, and
the electronic control unit is configured to increase a frequency with which the engine is started up, by setting the start determination power such that the start determination power when the driver switches the traveling mode to the charge-sustaining mode while the state-of-charge is higher than the upper limit of the control center value, is smaller, at the same vehicle speed, than the start determination power when the driver switches the traveling mode to the charge-sustaining mode while the state-of-charge is equal to or lower than the upper limit.

9. The hybrid vehicle according to claim 8, wherein the electronic control unit is configured to decrease the start determination power until the control center value becomes equal to or lower than the upper limit after the driver switches the traveling mode to the charge-sustaining mode.

10. The hybrid vehicle according to claim 1, wherein the electricity storage device is configured to be charged with electricity from an external power source.

11. A method of controlling a hybrid vehicle including a power generation apparatus that includes an engine and an electric motor, an electricity storage device, and an electronic control unit, the engine being provided with an exhaust gas catalyst, the electric motor being configured to generate electricity with use of at least part of power from the engine, the electricity storage device being configured to supply electricity to the electric motor or to be supplied with electricity from the electric motor, the hybrid vehicle being configured such that one of a charge-depleting mode and a charge-sustaining mode is selectively set as a traveling mode, and the hybrid vehicle being configured to permit a driver to perform switching between the charge-depleting mode and the charge-sustaining mode,
the method comprising starting up, by the electronic control unit, the engine with a higher frequency when the driver switches the traveling mode from the charge-depleting mode to the charge-sustaining mode while a state-of-charge of the electricity storage device is higher than an upper limit of a control center value of the state-of-charge in the charge-sustaining mode, than when the driver switches the traveling mode from the charge-depleting mode to the charge-sustaining mode while the state-of-charge is equal to or lower than the upper limit of the control center value, and
setting, by the electronic control unit, the control center value to a value equal to or higher than the upper limit, based on the state-of-charge at a time of switching of the traveling mode to the charge-sustaining mode, when the driver switches the traveling mode to the charge-sustaining mode while the state-of-charge is higher than the upper limit of the control center value, and decreasing the control center value over time.

* * * * *